US009227428B2

(12) United States Patent
Williams

(10) Patent No.: US 9,227,428 B2
(45) Date of Patent: Jan. 5, 2016

(54) SIMULATED EMBOSSING AND IMPRINTING

(75) Inventor: Leon Williams, Walworth, NY (US)

(73) Assignee: Electronics for Imaging, Inc., Fremont, CA (US)

( * ) Notice: Subject to any disclaimer, the term of this patent is extended or adjusted under 35 U.S.C. 154(b) by 224 days.

(21) Appl. No.: 13/600,015

(22) Filed: Aug. 30, 2012

(65) Prior Publication Data

US 2013/0335757 A1 Dec. 19, 2013

Related U.S. Application Data

(60) Provisional application No. 61/661,721, filed on Jun. 19, 2012.

(51) Int. Cl.
*G06F 15/00* (2006.01)
*B41J 3/38* (2006.01)

(52) U.S. Cl.
CPC ........................................ B41J 3/38 (2013.01)

(58) Field of Classification Search
CPC . H04N 1/60; H04N 1/32144; H04N 1/32208; H04N 1/32224; H04N 1/32235; H04N 1/387; H04N 1/3872; H04N 1/3876; G06K 15/02; G03G 15/6585; G03G 2215/00805; G03G 2215/00793; B41J 3/38
USPC ............... 358/1.9, 3.28, 3.29, 1.18, 537, 538, 358/452, 453, 450; 101/3.1; 40/596, 616, 40/743; 434/403; 382/254, 260, 277, 282, 382/283, 284, 285
See application file for complete search history.

(56) References Cited

U.S. PATENT DOCUMENTS

| 4,626,669 | A | | 12/1986 | Davis et al. |
| 5,528,733 | A | | 6/1996 | Luttmer |
| 5,793,936 | A | * | 8/1998 | Deffner et al. ................. 358/1.9 |
| 6,042,888 | A | * | 3/2000 | Sismanis et al. .............. 427/256 |
| 6,529,214 | B1 | * | 3/2003 | Chase et al. ................... 715/744 |
| 7,403,309 | B2 | * | 7/2008 | Moncrieff ..................... 358/3.12 |
| 7,455,235 | B2 | * | 11/2008 | Le Gouic et al. ............. 235/492 |
| 2002/0181025 | A1 | | 12/2002 | Yamaguchi |
| 2003/0160819 | A1 | * | 8/2003 | Chase ........................... 345/744 |
| 2004/0120596 | A1 | * | 6/2004 | Ishii et al. ..................... 382/254 |
| 2004/0189662 | A1 | | 9/2004 | Frisken et al. |
| 2005/0007632 | A1 | * | 1/2005 | Miyazaki et al. ............ 358/1.18 |
| 2008/0205785 | A1 | | 8/2008 | Geiger et al. |
| 2009/0052735 | A1 | | 2/2009 | Rhoads |
| 2011/0116117 | A1 | * | 5/2011 | Abergel et al. ................ 358/1.9 |
| 2011/0299775 | A1 | * | 12/2011 | Kluzner et al. ............... 382/173 |
| 2012/0107007 | A1 | * | 5/2012 | Qiao et al. ...................... 399/82 |
| 2012/0206742 | A1 | * | 8/2012 | Palomo et al. ................ 358/1.9 |

FOREIGN PATENT DOCUMENTS

EP 0864014 1/2002

OTHER PUBLICATIONS

Catenary Systems Inc., Victor Image Processing Library How-To Tips—How to Emboss an Image, 1997.*

* cited by examiner

*Primary Examiner* — Peter K Huntsinger
*Assistant Examiner* — Walter Yehl
(74) *Attorney, Agent, or Firm* — Michael A. Glenn; Perkins Coie LLP

(57) ABSTRACT

Image processing is used to simulate the appearance of an embossed print. The application of clear dry ink or spot varnish to the print generates the tactile feel of an embossed print. Embodiments thus provide a technique that simulates the effect of an embossed print without the need for plates or specialized equipment, other than a printer that is adapted to apply clear dry ink or spot varnish.

56 Claims, 9 Drawing Sheets

SIMULATED EMBOSSING AND IMPRINTING

CROSS REFERENCE TO RELATED APPLICATIONS

This application claims priority to U.S. provisional patent application Ser. No. 61/661,721, filed Jun. 19, 2012, which application is incorporated herein in its entirety by this reference thereto.

BACKGROUND OF THE INVENTION

1. Technical Field

The invention relates to printing. More particularly, the invention relates to simulated embossing and imprinting.

2. Description of the Background Art

Embossed printing requires the creation of embossing plates to imprint the print media with raised and/or depressed surfaces that reflect light differently from than of flat, i.e. non-embossed, print media. Embossing is typically accomplished by applying heat and pressure with male and female dies, usually made of copper or brass, that fit together and squeeze the fibers of the print media. The combination of pressure and heat raises the level of the image higher than the substrate, while ironing it to make it smooth. In printing this is accomplished on a letterpress. The most common machines are the Kluge Letterpress and the Heidelberg Letterpress. The cost of creating the embossing plates and the time required to emboss that print media make embossed documents expensive to manufacture.

SUMMARY OF THE INVENTION

Embodiments of the invention concern the use of image processing to simulate the appearance of an embossed print, coupled with the application of clear dry ink or spot varnish to generate the tactile feel of an embossed print. Thus, the invention provides a technique that simulates the effect of an embossed print without the need for plates or specialized equipment, other than a printer that is adapted to apply clear dry ink or spot varnish.

DETAILED DESCRIPTION OF THE INVENTION

Embodiments of the invention concern the use of image processing to simulate the appearance of an embossed print, coupled with the application of clear dry ink or spot varnish to generate the tactile feel of an embossed print. Thus, the invention provides a technique that simulates the effect of an embossed print without the need for plates or specialized equipment, other than a printer that is adapted to apply clear dry ink or spot varnish.

Figure 1:
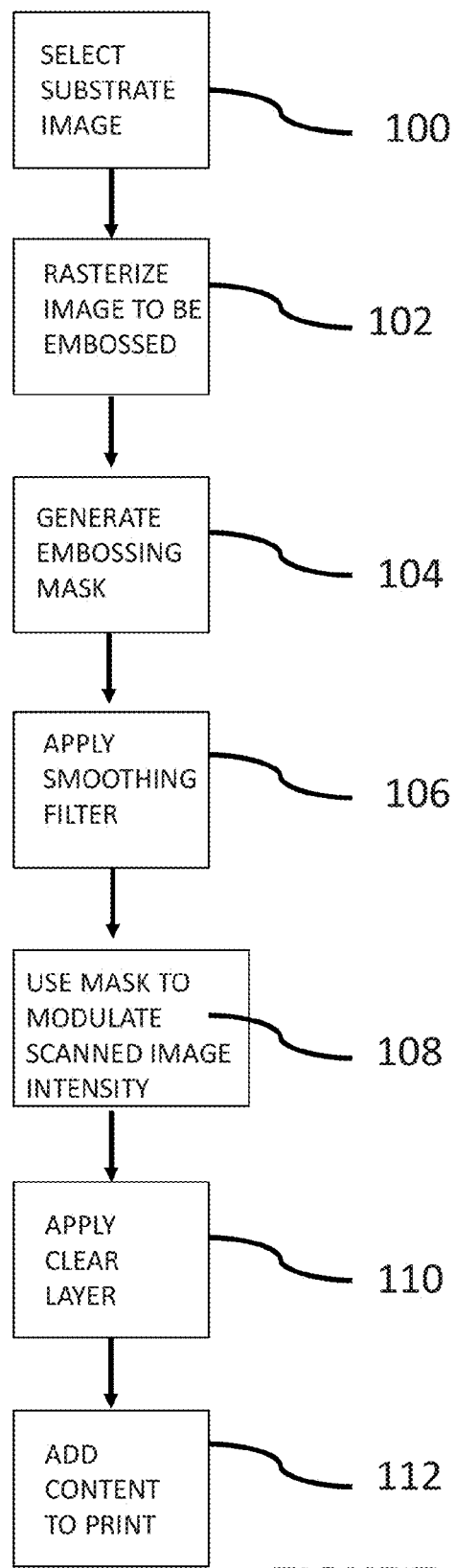
FIG. 1 is a flow diagram showing a technique for simulating embossing and imprinting according to the invention.

FIG. 1 is a flow diagram showing a technique for simulating embossing and imprinting according to the invention. In the following discussion, FIGS. 2-8 are discussed in connection with the steps shown in FIG. 1.

Figure 2:
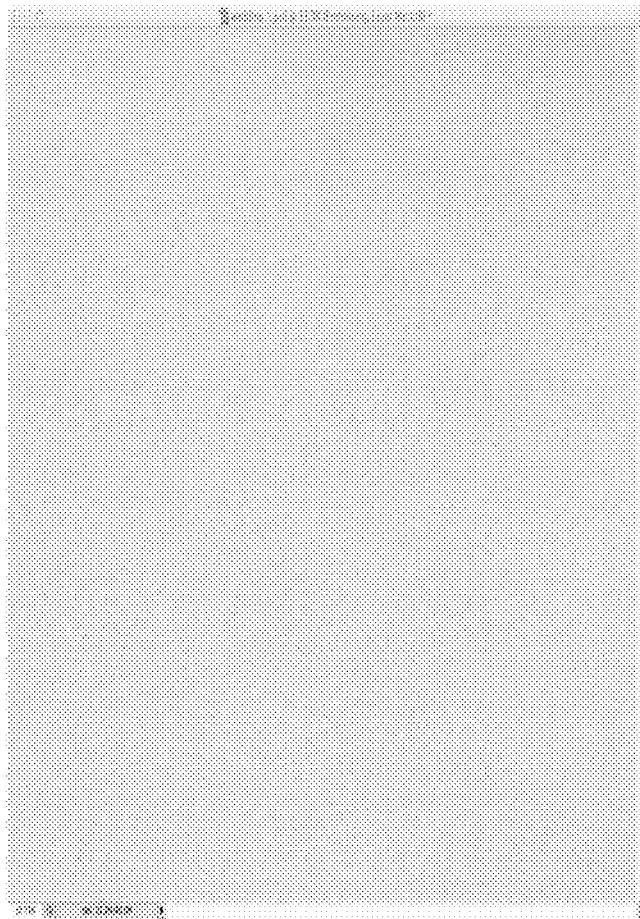
FIG. 2 shows an example of a non-white image of a specific paper substrate for use in practicing the herein disclosed invention.

To simulate the visual appearance of an embossed area, embodiments of the invention start with a non-white image of a specific paper substrate to both lighten and darken regions to simulate the surface normal light reflection (FIG. 1: 100). FIG. 2 shows an example of a non-white image of a specific paper substrate for use in practicing the herein disclosed invention. Specifically, a scanned image of ivory or other colored paper is adequate for this purpose. Embodiments of the invention contain a library of suitable images and/or enable an operator to make hue and lightness adjustment to recreate a wide variety of artisan paper stocks.

Figure 3:
FIG. 3 shows an example of a document, which contains the vector or image art to be embossed, rasterized into an image that is the same size as the final print according to the invention.
Figure 4:
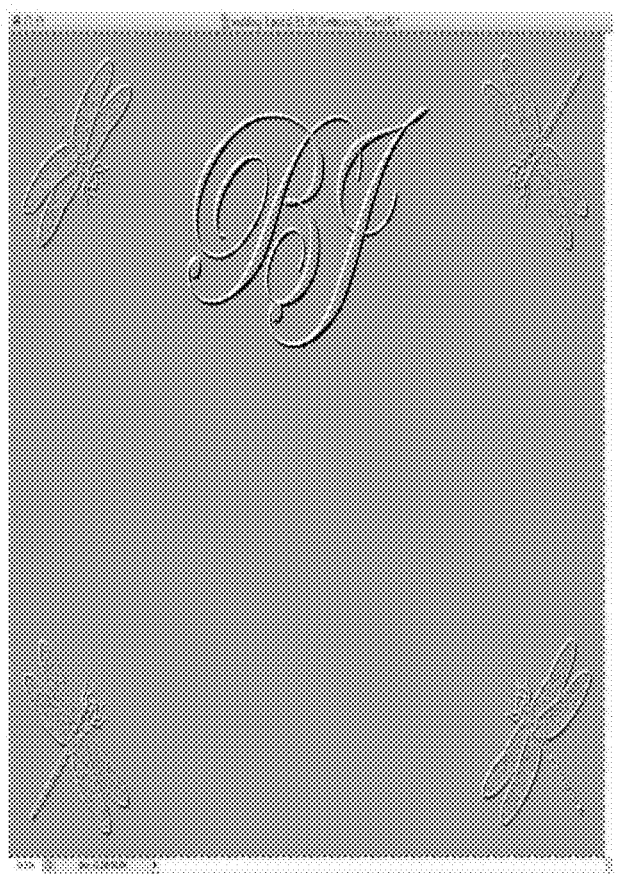
FIG. 4 shows an example of an embossing mask according to the invention.

A document, which contains the vector or image art to be embossed, is rasterized into an image the same size as the final print (FIG. 1: 102). Vector art (also referred to as vector graphics) is a term that is used herein to represent the mathematical description of text and line drawings. Vector graphics comprise the use of geometrical primitives, such as points, lines, curves, and shapes or polygons, which are all based on mathematical expressions, to represent images in computer graphics. Vector in this context implies more than a straight line. For text, such as described in the opentype specification (ISO/IEC 14496-22:2009), these can be splines which allow the shape of various fonts and characters to be specified without regard to the resolution of the printing device. This could either be a separate document for the embossed layer or the full document with non-embossed text and images out of which the embossing content is selected. FIG. 3 shows an example of a document, which contains the vector or image art to be embossed, rasterized into an image that is the same size as the final print according to the invention.

An embossing mask is generated from the image and vector graphics above (FIG. 1: 104). This can be accomplished using convolution with a 3×3 (or larger) kernel for the desired lighting direction and pixel width specified. The mask is generated to modulate the lightness of the paper stock and should be thought of as an image to lighten or darken pixels of the stock image. The mask performs two functions: 1) it selects the area of the paper stock image to modify and 2) the gray level of the mask controls how much the paper stock image it lightened or darkened within this area. The result is the large characters "BJ" in FIG. 6. For example, a 1 pixel convolution at the angle of 135 degrees is generated from the kernel {−1 0 0, 0 0 0, 0 0 1}. For an example of the well understood embossing algorithm, see http://www.catenary.com/howto/emboss.html. Because the sum of the 3×3 convolution kernel is 0, only edges are output from the convolution. Use of −1 in the upper left and 1 in the lower right produces edges that are oriented from the upper left which is 90+45 or 135 degrees from the raster direction. Using a convolution kernel to generate a 135 degree of 12 pixels at 50% amplitude yields the example of an embossing mask shown in FIG. 4.

Figure 5:
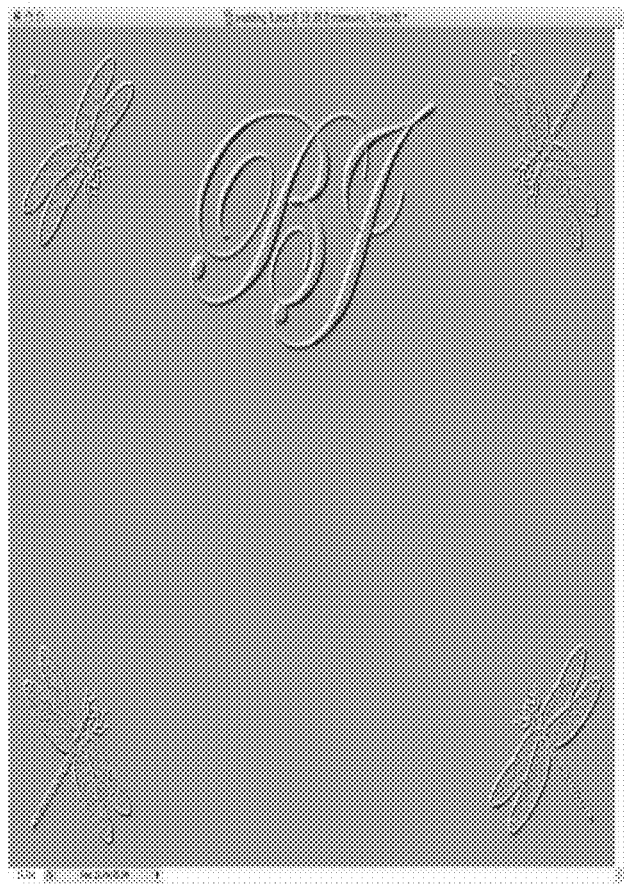
FIG. 5 shows an example of an additional filter that can be applied to smooth the larger embossed regions to more closely simulate the natural softness of paper deformation according to the invention.

An additional filter can be applied to smooth the larger embossed regions to simulate the natural softness of paper deformation more closely (FIG. 1: 106). Different filters can be applied to generate different effects other than the softness described above. Other filter examples can include edge detection to simulate an outline of the vector graphics, the addition of pixel-by-pixel noise of appropriate special characteristics to create the illusion of increased paper roughness, and color filters to simulate the illumination or reflection of colored light or ink. A Gaussian low pass filter is applied to the script letters, but not to the fine artwork. In an embodiment, this can be accomplished by limiting the regions to which the filter is applied, either by another mask or by setting a region of X,Y coordinates inside which the filter is applied and outside of which no filtering is applied. FIG. 5 shows an example of an additional filter that can be applied to smooth the larger embossed regions to more closely simulate the natural softness of paper deformation according to the invention.

Figure 6:
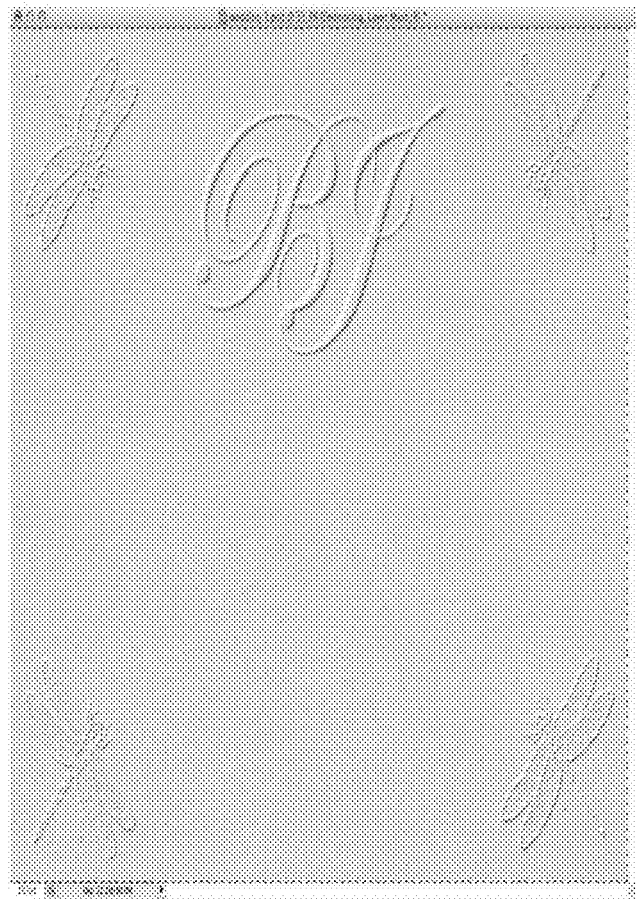
FIG. 6 shows an example of use of a mask to modulate the intensity of the scanned image of the artisan paper of FIG. 1 to yield the image of the embossed paper according to the invention.

The mask can now be used to modulate the intensity of the scanned image of the artisan paper shown above to yield the image of the embossed paper (FIG. 1: 108). For purposes of the discussion herein, modulation means the pixel-by-pixel multiplication of the image mask with the scanned image of the paper. Assuming the scanned image of the paper is in RGB color space, for each pixel of the scanned image, the R, G, and B components of that pixel are multiplied by the corresponding pixel value of the mask. Images in other colors spaces can be used and the modulating the lightness of these spaces is well known. For example, assume that when the mask is gray, the scanned paper image is multiplied by 1, in which case there is no change. Where the mask is lighter than the uniform gray, the multiplication increases the lightness of the scanned paper making it lighter. Likewise, where the mask is darker than the uniform gray, the lightness of the scanned paper is reduced making it darker. FIG. 6 shows an example of use of a mask to modulate the intensity of the scanned image of the artisan paper of FIG. 2 to yield the image of the embossed paper according to the invention.

Figure 7:
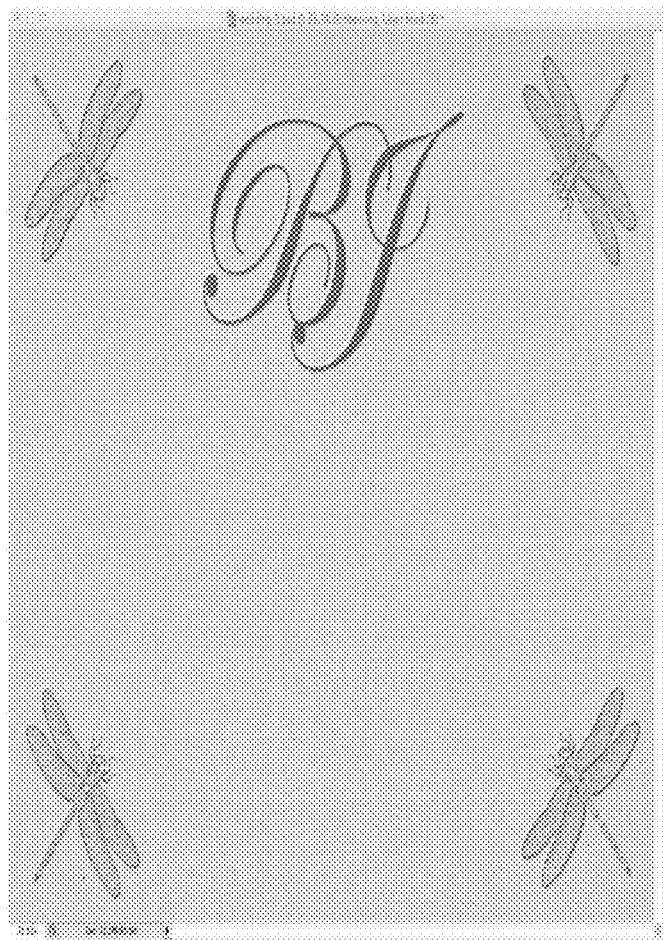
FIG. 7 shows a clear layer using a red mask to represent a clear layer according to the invention.

The image now simulates the visual results of an embossed image, but lacks the tactile feel of true embossing. By applying the original artwork layer used to create the embossing layer, as shown in FIG. 3 as the clear layer, the dimensional aspect of the invention is added. The clear layer can be applied one or more times to build up the desired thickness (FIG. 1: 110). FIG. 7 shows a clear layer using a red mask to represent a clear layer according to the invention. In this example, the clear layer is a copy of the image of FIG. 3, i.e. the embossing vector and image art. Embodiments of the invention can be used with the Prowler (Xerox Chamonix) engine that supports clear toner of up to five layers, but it could also be used with MGI Spot Varnish Systems. The process described in this embodiment is performed by the computer. The printer applies clear toner and/or ink where instructed by the resulting bitmap, as with CMYK printing, but with a fifth colorant that is clear.

Figure 8:
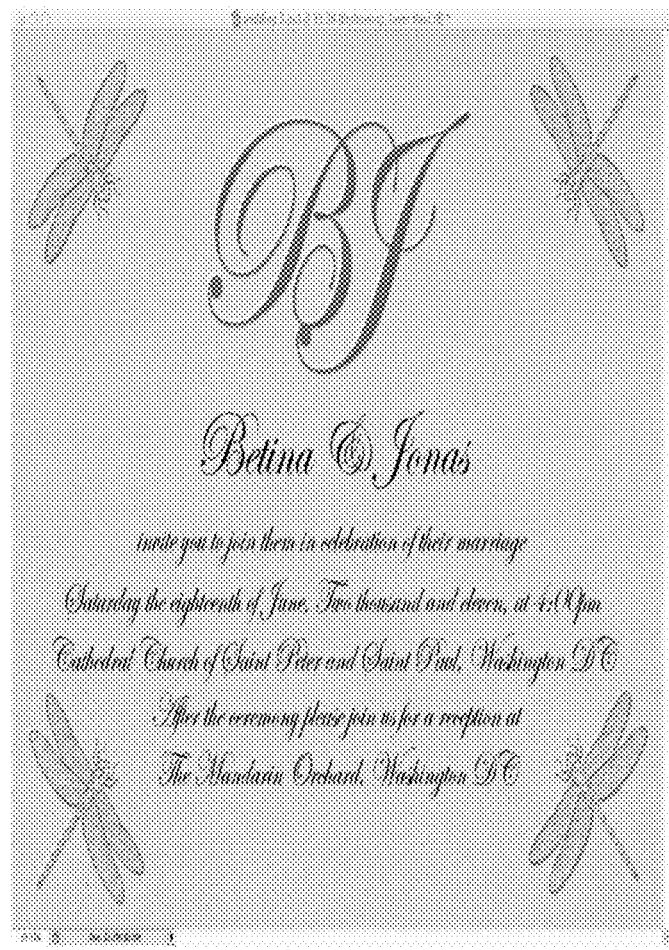
FIG. 8 shows an example of text of the content that is not to be embossed added to the final print according to the invention.

Finally, all that is needed is to add to the print the text or images of the content that is not to be embossed (FIG. 1: 112). FIG. 8 shows an example of text of the content that is not to be embossed added to the final print according to the invention.

Computer Implementation

Figure 9:
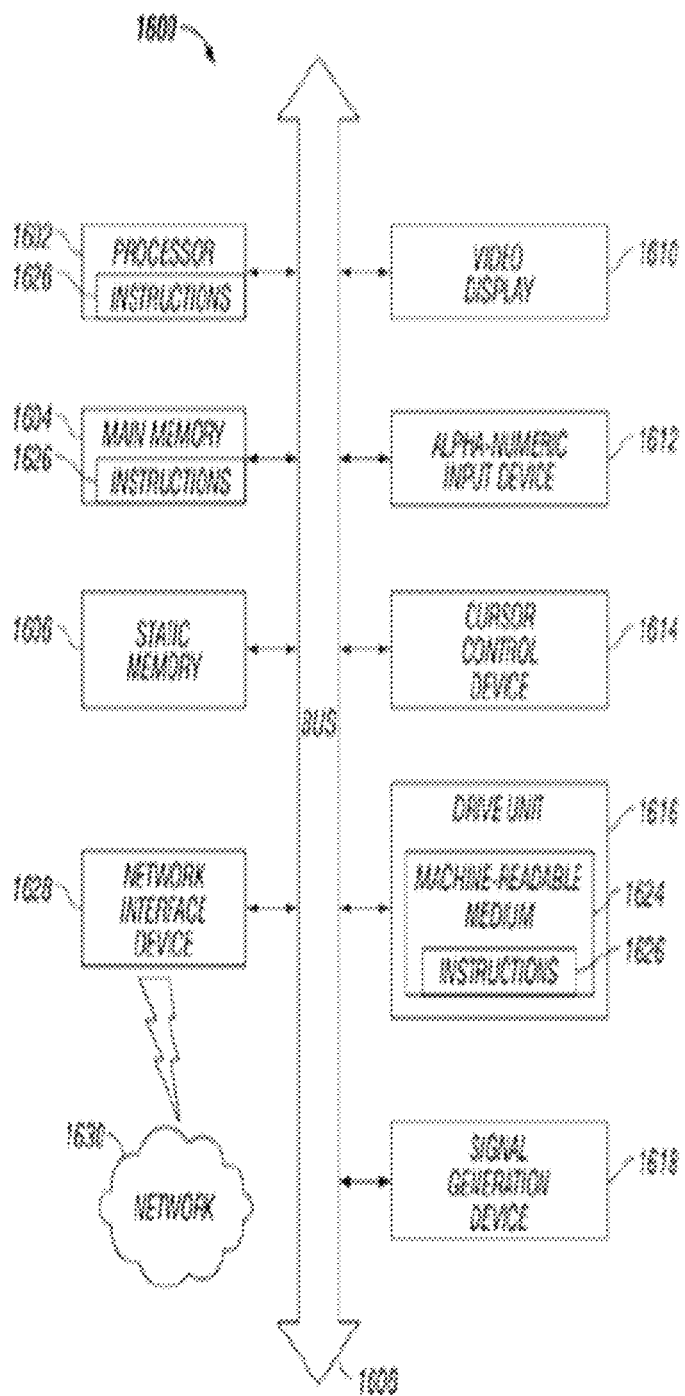
FIG. 9 is a block schematic diagram that depicts a machine in the exemplary form of a computer system within which a set of instructions for causing the machine to perform any of the herein disclosed methodologies may be executed.

FIG. 9 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention.

For example, embodiments of the invention provide a technique for effecting the process of imprinting. While the term "embossing" is defined herein as a technique for giving the appearance of raising the vector art above the surrounding paper, the term "imprinting" refers to an embodiment of the invention that provides an effect that is the reverse of embossing, where the vector art gives the appearance of being depressed into the surrounding paper. Thus, those skilled in the art will appreciate that the technique disclosed herein is equally applicable to imprinting.

Accordingly, the invention should only be limited by the Claims included below.

The invention claimed is:

1. A method for simulating the appearance of an embossed print, comprising:
    selecting an image of a paper substrate;
    rasterizing a vector or image art to be embossed, with a processor into an image having a same size as a final print;
    said processor generating an embossing mask from said rasterized image and vector art, wherein said embossing mask is an image that lightens and darkens pixels of the paper substrate image;
    said processor using said mask to modulate intensity of said paper substrate image, by lightening and darkening pixels of said paper substrate by pixel-by-pixel multiplication of said mask with said rasterized image and vector art of said paper substrate, to yield an embossed paper image, wherein said embossed paper image simulates visual results of an embossed image;
    said processor operating a printer to apply to said paper substrate said rasterized image and vector art, used to create the embossed paper image, as a clear layer to add a dimensional or tactile aspect to said paper substrate; and
    said processor adding to said paper substrate any of text and image content that is not to be embossed.

2. The method of claim 1, said selecting comprising:
    providing a processor configured for adjusting a non-white image of a specific paper substrate to both lighten and darken regions of the substrate to simulate a surface normal light reflection.

3. The method of claim 2, said non-white image comprising ivory or other colored paper.

4. The method of claim 1, further comprising:
    selecting said image from a library of suitable images.

5. The method of claim 1, further comprising:
    providing a processor configured for adjusting said image hue and lightness to recreate a wide variety of artisan paper stocks.

6. The method of claim 1, said rasterizing performed on any of a separate document for an embossed layer or a full document with a non-embossed text and images out of which an embossing content is selected.

7. The method of claim 1, further comprising:
    said processor generating said embossing mask using convolution with a at least a 3×3 kernel for a desired lighting direction and pixel width.

8. The method of claim 1, further comprising:
    said processor applying an additional filter to smooth larger embossed regions to simulate natural softness of paper deformation.

9. The method of claim 8, said additional filter comprising a Gaussian low pass filter that is applied to script letters, but not to fine artwork.

10. The method of claim 1, further comprising:
    said processor applying an additional filter to simulate an outline of the vector graphics.

11. The method of claim 1, further comprising:
    said processor applying an additional filter for addition of pixel-by-pixel noise of appropriate special characteristics to create an illusion of increased paper roughness.

12. The method of claim 1, further comprising:
    said processor applying a color filter to simulate any of illumination and reflection of colored light or ink.

13. The method of claim 1, wherein said clear layer is applied one or more times to build up a desired thickness.

14. The method of claim 1, wherein said clear layer is applied using a red mask to represent a clear layer.

15. An apparatus for simulating the appearance of an embossed print, comprising:
    a processor configured for selecting an image of a paper substrate;
    said processor configured for rasterizing a vector or image art to be embossed into an image having a same size as a final print;
    said processor configured for generating an embossing mask from said rasterized image and vector art, wherein said embossing mask is an image that lightens and darkens pixels of the paper substrate image;
    said processor using said mask to modulate intensity of said paper substrate image, by lightening and darkening pixels of said paper substrate by pixel-by-pixel multiplication of said mask with said rasterized image and vector art of said paper substrate, to yield an embossed paper image, wherein said embossed paper image simulates visual results of an embossed image;
    said processor operating a printer to apply to said paper substrate said rasterized image and vector art, used to create the embossed paper image, as a clear layer to add a dimensional or tactile aspect to said paper substrate; and
    said processor adding to said paper substrate any of text and image content that is not to be embossed.

16. The apparatus of claim 15, comprising:
    said processor configured for adjusting a non-white image of a specific paper substrate to both lighten and darken regions of the substrate to simulate a surface normal light reflection.

17. The apparatus of claim 16, said non-white image comprising ivory or other colored paper.

18. The apparatus of claim 15, comprising:
    said processor configured for selecting said image from a library of suitable images.

19. The apparatus of claim 15, comprising:
    said processor configured for adjusting said image hue and lightness to recreate a wide variety of artisan paper stocks.

20. The apparatus of claim 15, said processor configured for performing said rasterizing on any of a separate document for an embossed layer or a full document with a non-embossed text and images out of which an embossing content is selected.

21. The apparatus of claim 15, comprising:
    said processor configured for generating said embossing mask using convolution with a at least a 3×3 kernel for a desired lighting direction and pixel width.

22. The apparatus of claim 15, comprising:
    said processor configured for applying an additional filter to smooth larger embossed regions to simulate natural softness of paper deformation.

23. The apparatus of claim 15, comprising:
    said processor configured for applying an additional filter to simulate an outline of the vector graphics.

24. The apparatus of claim 15, comprising:
said processor configured for applying an additional filter for addition of pixel-by-pixel noise of appropriate special characteristics to create an illusion of increased paper roughness.

25. The apparatus of claim 15, comprising:
said processor configured for applying a color filter to simulate any of illumination and reflection of colored light or ink.

26. The apparatus of claim 22, said additional filter comprising a Gaussian low pass filter that is applied to script letters, but not to fine artwork.

27. The apparatus of claim 15, said processor configured for applying said clear layer one or more times to build up a desired thickness.

28. The apparatus of claim 15, said processor configured for applying said clear layer using a red mask to represent a clear layer.

29. A method for simulating the appearance of an imprinted print, comprising:
selecting an image of a paper substrate;
rasterizing a vector or image art to be imprinted with a processor into an image having a same size as a final print;
said processor generating an imprinting mask from said rasterized image and vector art, wherein said imprinting mask is an image that lightens and darkens pixels of the paper substrate image;
said processor using said mask to modulate intensity of said paper substrate image, by lightening and darkening pixels of said paper substrate by pixel-by-pixel multiplication of said mask with said rasterized image and vector art of said paper substrate, to yield an imprinted paper image, wherein said imprinted paper image simulates visual results of an imprinted image;
said processor operating a printer to apply to said paper substrate said rasterized image and vector art, used to create the imprinted paper image, as a clear layer to add a dimensional or tactile aspect to said paper substrate; and
said processor adding to said paper substrate any of text and image content that is not to be imprinted.

30. The method of claim 29, said selecting comprising:
providing a processor configured for adjusting a non-white image of a specific paper substrate to both lighten and darken regions of the substrate to simulate a surface normal light reflection.

31. The method of claim 30, said non-white image comprising ivory or other colored paper.

32. The method of claim 29, further comprising:
selecting said image from a library of suitable images.

33. The method of claim 29, further comprising:
providing a processor configured for adjusting said image hue and lightness to recreate a wide variety of artisan paper stocks.

34. The method of claim 29, said rasterizing performed on any of a separate document for an imprinted layer or a full document with a non-imprinted text and images out of which an imprinting content is selected.

35. The method of claim 29, further comprising:
said processor generating said imprinting mask using convolution with a at least a 3×3 kernel for a desired lighting direction and pixel width.

36. The method of claim 29, further comprising:
said processor applying an additional filter to smooth larger imprinted regions to simulate natural softness of paper deformation.

37. The method of claim 36, said additional filter comprising a Gaussian low pass filter that is applied to script letters, but not to fine artwork.

38. The method of claim 29, further comprising:
said processor applying an additional filter to simulate an outline of the vector graphics.

39. The method of claim 29, further comprising:
said processor applying an additional filter for addition of pixel-by-pixel noise of appropriate special characteristics to create an illusion of increased paper roughness.

40. The method of claim 29, further comprising:
said processor applying a color filter to simulate any of illumination and reflection of colored light or ink.

41. The method of claim 29, wherein said clear layer is applied one or more times to build up a desired thickness.

42. The method of claim 29, wherein said clear layer is applied using a red mask to represent a clear layer.

43. An apparatus for simulating the appearance of an imprinted print, comprising:
a processor configured for selecting an image of a paper substrate;
said processor configured for rasterizing a vector or image art to be imprinted into an image having a same size as a final print;
said processor configured for generating a an imprinting mask from said rasterized image and vector art, wherein said imprinting mask is an image that lightens and darkens pixels of the paper substrate image;
said processor configured for using said mask to modulate intensity of said paper substrate image, by lightening and darkening pixels of said paper substrate by pixel-by-pixel multiplication of said mask with said rasterized image and vector art of said paper substrate, to yield an imprinted paper image, wherein said imprinted paper image simulates visual results of an imprinted image;
said processor configured for operating a printer to apply to said paper substrate said rasterized image and vector art, used to create the imprinted paper image, as a clear layer to add a dimensional or tactile aspect to said paper substrate; and
said processor adding to said paper substrate any of text and image content that is not to be imprinted.

44. The apparatus of claim 43, comprising:
said processor configured for adjusting a non-white image of a specific paper substrate to both lighten and darken regions of the substrate to simulate a surface normal light reflection.

45. The apparatus of claim 44, said non-white image comprising ivory or other colored paper.

46. The apparatus of claim 43, comprising:
said processor configured for selecting said image from a library of suitable images.

47. The apparatus of claim 43, comprising:
said processor configured for adjusting said image hue and lightness to recreate a wide variety of artisan paper stocks.

48. The apparatus of claim 43, said processor configured for performing said rasterizing on any of a separate document for an imprinted layer or a full document with a non-imprinted text and images out of which an imprinting content is selected.

49. The apparatus of claim 43, comprising:
said processor configured for generating said imprinting mask using convolution with a at least a 3×3 kernel for a desired lighting direction and pixel width.

50. The apparatus of claim 43, comprising:
said processor configured for applying an additional filter to smooth larger imprinted regions to simulate natural softness of paper deformation.

51. The apparatus of claim 43, comprising:
said processor configured for applying an additional filter to simulate an outline of the vector graphics.

52. The apparatus of claim 50, said additional filter comprising a Gaussian low pass filter that is applied to script letters, but not to fine artwork.

53. The apparatus of claim 43, comprising:
said processor configured for applying an additional filter for addition of pixel-by-pixel noise of appropriate special characteristics to create an illusion of increased paper roughness.

54. The apparatus of claim 43, comprising:
said processor configured for applying a color filter to simulate any of illumination and reflection of colored light or ink.

55. The apparatus of claim 43, said processor configured for applying said clear layer one or more times to build up a desired thickness.

56. The apparatus of claim 43, said processor configured for applying said clear layer using a red mask to represent a clear layer.

* * * * *